April 5, 1949.  S. M. GOLDBERG  2,466,020
PORTABLE CHLORINE GAS GENERATOR AND INHALER
Filed Jan. 21, 1947  3 Sheets-Sheet 1
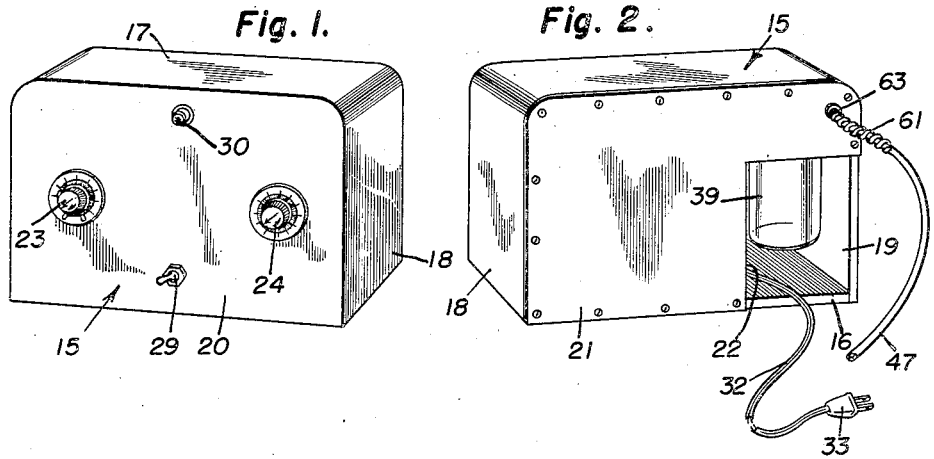
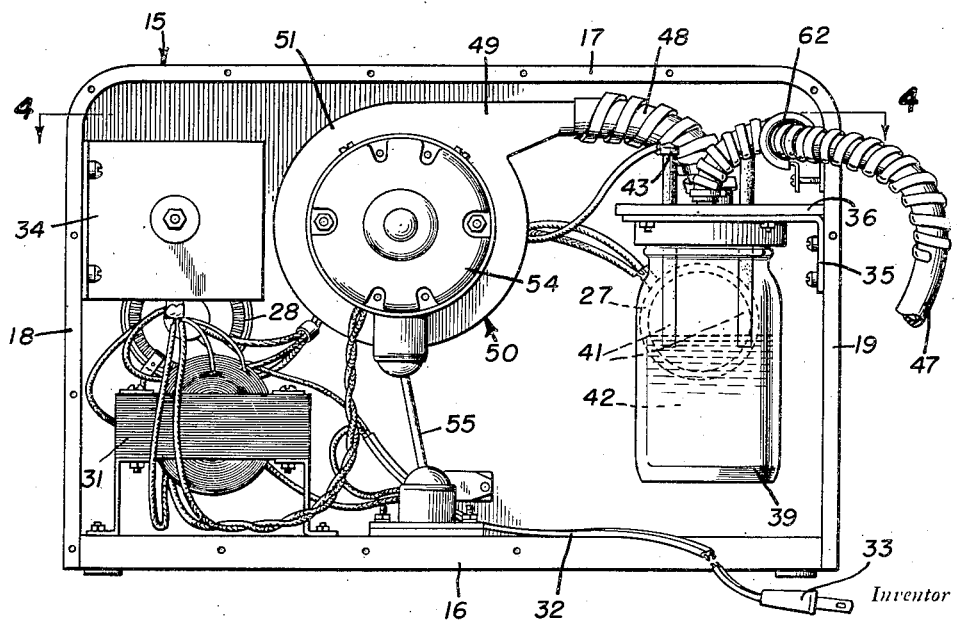
Inventor
Simon M. Goldberg
By Clarence A. O'Brien
and Harvey B. Jacobson
Attorneys

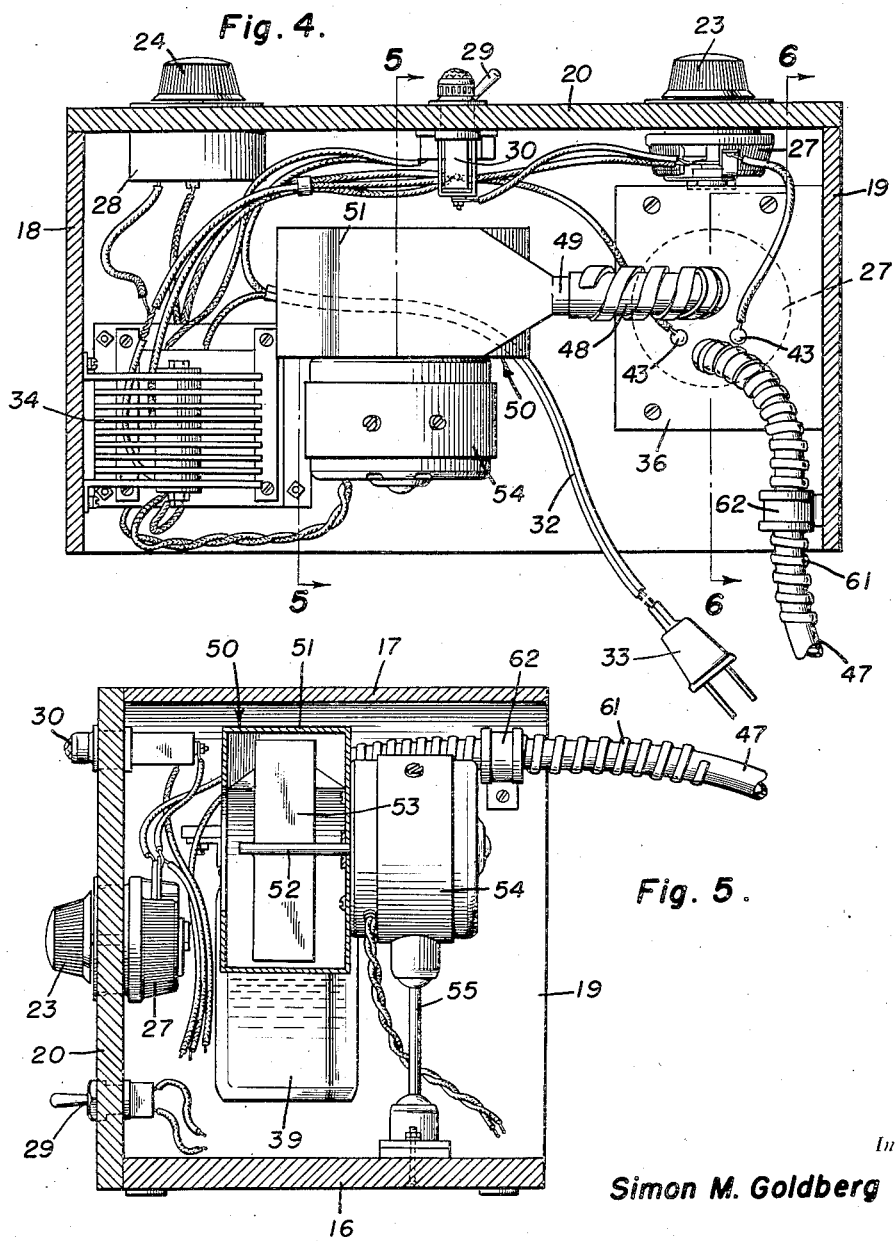

April 5, 1949.　　　　S. M. GOLDBERG　　　　2,466,020
PORTABLE CHLORINE GAS GENERATOR AND INHALER
Filed Jan. 21, 1947　　　　　　　　　　3 Sheets—Sheet 3

Inventor
Simon M. Goldberg

By Clarence A. O'Brien
and Harvey B. Jacobson
Attorneys

Patented Apr. 5, 1949

2,466,020

UNITED STATES PATENT OFFICE 2,466,020

PORTABLE CHLORINE GAS GENERATOR AND INHALER

Simon M. Goldberg, Tucson, Ariz.

Application January 21, 1947, Serial No. 723,333

1 Claim. (Cl. 128—185)

This invention relates to a portable chlorine gas generator and inhaler and has for its primary object to produce chlorine gas and facilitate its application for therapeutic purposes.

Another object is to conduct the gas together with a volume of diluent such as air to the zone of application, and to so regulate the mixture as to avoid irritation of the parts undergoing treatment.

A still further object is to so construct and assemble the generator and the attendant parts of the inhaler as to render the device readily portable so that treatments may be given to patients in widely separated areas without requiring that the patient call at a central station.

The above and other objects may be attained by employing this invention which embodies among its features a supporting plate having an internally screw threaded depending collar on its underside, said plate having within the confines of the collar an air and gas discharge opening and an air inlet opening in spaced parallel relation to the air and gas discharge opening, said plate also having spaced parallel electrode receiving openings therein, a container for a saline solution detachably supported in the screw threaded collar, electrodes extending through the electrode receiving openings in the plate for immersion in the saline solution in the container, means to supply direct current to the immersed electrodes to generate chlorine gas in the container, means to introduce air into the container to mix with the gas and means connected to the air and gas discharge opening to conduct the mixture of air and gas from the container to a zone of application.

Other features include housing the various elements of the device in a compact unit within a case which may be conveniently transported.

Still other features include a motor driven blower mounted on the supporting plate to introduce air through the air inlet opening therein and into the container to mix with the gas generated therein.

Still other features include means for regulating the air input into the container, means independently to regulate the evolution of gas in the container and switch means simultaneously to disconnect the air discharge means and the electrodes from a power source.

In the drawings:

Figure 1 is a perspective view of a portable chlorine generator and inhaler embodying the features of this invention, Figure 2 is a perspective view of the rear side of the device, Figure 3 is a rear end view of the device showing the cover plate removed, Figure 4 is a longitudinal sectional view taken substantially along the line 4—4 of Figure 3.

Figure 5 is a transverse sectional view taken substantially along the line 5—5 of Figure 4.

Figure 6:
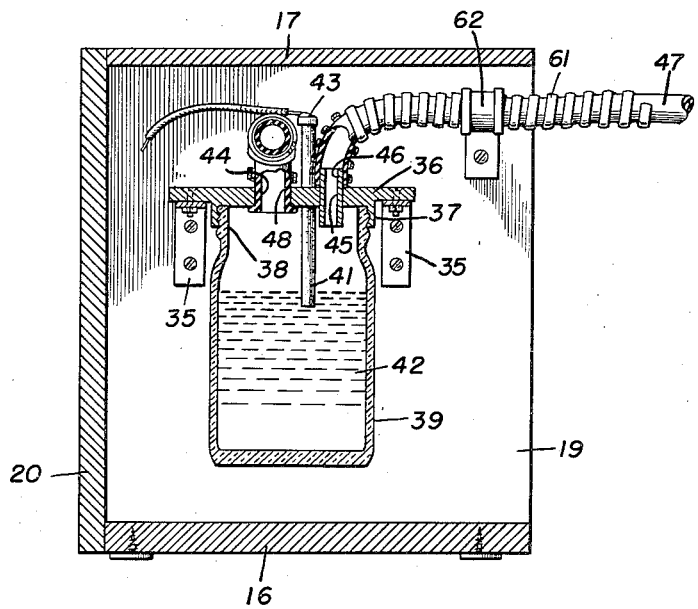
Figure 6 is a transverse sectional view taken substantially along the line 6—6 of Figure 4.

Referring to the drawings in detail, this improved generator and inhaler comprises a cabinet designated generally 15 constructed of a bottom wall 16, top wall 17, end walls 18 and 19 and a front wall 20. The back of the cabinet is adapted to be closed by a removable back wall 21 which as illustrated in Figure 2 has one corner cut out as at 22 to provide an access opening for the container forming a part of the chlorine generator to be more fully hereinafter described.

Formed in the front wall 20 are longitudinally spaced openings for the reception of the shanks of control knobs 23 and 24, the shanks of which are connected respectively to the contact fingers of rheostats 27 and 28. Also formed in the front wall 20 are laterally spaced openings in one of which a switch unit 29 is seated while the other contains a suitable pilot light 30 which operates as a visual indicator to show when the switch 29 is in "on" and "off" position.

Mounted on the bottom wall 16 within the cabinet 15 is a transformer 31 which is connected through conductors contained in a flexible cord 32 with an attachment plug 33 by which power may be supplied to the transformer from a convenient outlet. At least one of the conductors of the flexible cord 32 is connected in a conventional manner to the switch 29 and through the pilot light 30 so that when the switch is in "on" position and the transformer is energized, the pilot light will be lighted, and conversely when the switch is in "off" position and the transformer de-energized the pilot light will be out. The secondary of the transformer 31 is coupled through the rheostat 27 to the chlorine gas generator to be more fully hereinafter described and also is coupled through the rheostat 28 to the drive motor of the blower to be more fully hereinafter described. A conventional rectifier 34 is mounted on the end wall 18 of the cabinet in a position to be enclosed therein and is coupled in circuit with the secondary of the transformer and the gas generator and rheostat 27 so as to regulate the flow of electrical energy from the rectifier to the generator.

Fixed on suitable angle brackets 35 attached to the end wall 19 of the cabinet 15 and wholly enclosed within the cabinet is a supporting plate 36 formed of a non-conducting material which is resistant to attack by chlorine gas. An internally screw threaded collar 37 depends from the underside of the plate 36 into which the upper externally screw threaded neck 38 of a container 39, such as a glass jar is received. Formed at diametrically spaced points in the plate 36 within the confines of the collar 37 are parallel openings 40 for the reception of electrodes 41, the lower ends of which are adapted to extend into the container 39 and be immersed in a saline solution 42 contained within the jar and comprising sodium chloride dissolved in water. The upper ends of the electrodes 41 are provided with suitable metal caps 43 to which the conductors leading from the rectifier and through the rheostat 27 are electrically connected. Also formed in the plate 36 with their axes lying in a plane perpendicular to the plane of the axes of the electrodes 41 are spaced openings 44 and 45. The opening 45 is surrounded on the upper side of the plate by a collar 46 to which one end of a flexible tube 47 is coupled and through which the gas generated within the container 39 is conducted to the zone of application. In the form of the invention illustrated in Figures 2 to 6 inclusive a flexible tube 48 communicates with the interior of the container 39 through the opening 44 and the end of the tube 48 opposite that entering the opening 44 is connected to the discharge nozzle 49 of a motor driven blower designated generally 50. This motor driven blower 50 comprises a conventional blower casing 51 in which is mounted a drive shaft 52 carrying a fan blade 53 and driven by a conventional low voltage electric motor 54 which is coupled to the secondary of the transformer 31 through the rheostat 28 so that the speed of operation of the motor and hence the fan blade 53 may be regulated. This motor 54 is coupled to the blower housing in any conventional manner so that the motor and blower form a unit, and secured to the bottom 16 of the cabinet 15 and to the motor 54 is a suitably adjustable motor support 55.

Figure 7:
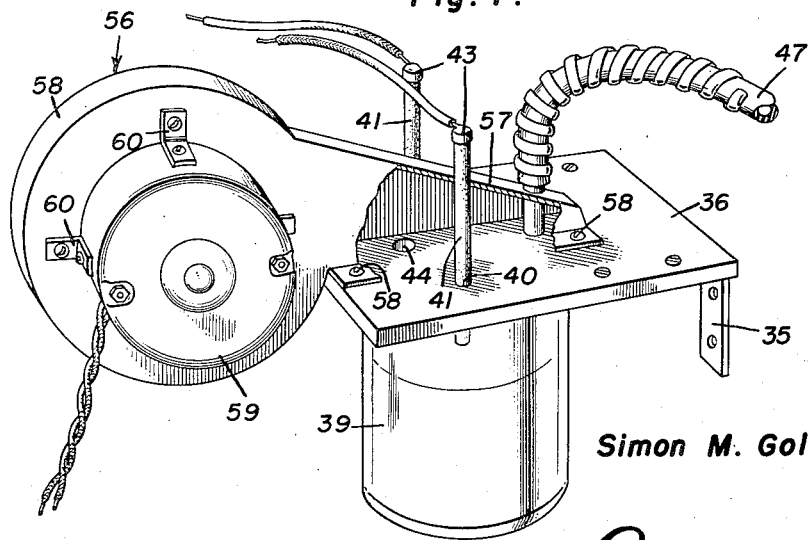
Figure 7 is a perspective view of the supporting plate and a modified form of motor driven blower.

In the modified form of the device illustrated in Figure 7 the plate 36 is provided with the conventional openings above described for the electrodes 41 and for the inlet of air and discharge of gas and the only difference between the modified structure and that previously described resides in the construction and mounting of the blower designated generally 56. In this type of device the nozzle 57 of the blower is attached as by screws 58 to the plate 36 so that the air inlet opening 44 in said plate is housed wholly within the blower nozzle. The nozzle is coupled in a conventional manner with the blower casing 58 containing a fan or impeller corresponding to the impeller or fan 53 which is driven by a conventional motor 59 mounted on the blower casing 58 by supporting brackets 60. In this type of device the motor support 55 is dispensed with and the entire weight of the motor and blower is supported upon the plate 36. This arrangement enables the unit to be housed in a minimum amount of space as will be readily understood upon reference to Figure 7.

Surrounding the flexible tube 47 in the immediate vicinity of its coupling with the collar 46 is a coiled protector 61 and surrounding the tube 47 and attached to the wall 19 is a suitable supporting bracket 62 by which the tube is directed outwardly through an opening 63 formed in the back wall 21 as will be readily understood upon reference to Figure 2.

In use it will be understood that the plug 33 is introduced into a convenient wall outlet whereupon the switch 29 may be turned on so as to establish a flow of electric current through the primary of the transformer 31. The container 39 is then filled with water to the desired height, preferably just so that the lower ends of the electrodes 41 will be immersed therein and a quantity of sodium chloride, or common table salt, is then introduced into the container and the container screwed into place in the collar 37. When in proper position, the lower ends of the electrodes 41 will then be immersed in the saline solution in the container and upon regulating the flow of the electric current from the secondary of the transformer through the rectifier to the electrodes by means of the rheostat 27, the rapidity with which chlorine gas is evolved may be governed. This regulation is accomplished merely by rotating the knob 23. When it is desired to apply the chlorine thus evolved to an afflicted portion of the anatomy the knob 24 of the rheostat 28 is manipulated to regulate the flow of electrical power from the transformer 31 through the motor 54, thus governing the speed with which the impeller or fan 53 is driven and hence the volume and velocity of air admitted into the container 39 above the solution therein. The air thus introduced into the container above the solution 42 will mix with the chlorine gas generated and force the latter out through the tube 47 through which it is directed to the zone to be treated. Obviously by adjusting the rapidity of evolution of the gas and balancing it with the velocity and volume of air admitted by means of the motor driven blower 50 it is obvious that sufficient dilution of the gas may be accomplished to avoid irritation of the membranes to which the mixture is being applied. By proper adjustment of the rheostats a very small amount of chlorine may be produced and a large volume of air introduced into the chamber at the top of the container 29 so that an extremely diluted stream of chlorine gas will be impelled through the tube 47. By manipulating the knob 23 it is obvious that the evolution of the chlorine gas may be increased and by manipulating the knob 24 the speed of operation of the blower may be decreased until such time as a proper concentration of chlorine is obtained.

While in the foregoing there has been shown and described the preferred embodiment of this invention it is to be understood that minor changes in the details of construction, combination and arrangement of parts may be resorted to without departing from the spirit and scope of the invention as claimed.

I claim:

In a portable chlorine gas generator and inhaler, a rectangular housing, a supporting plate within said housing, an internally screw threaded collar depending from the underside of the plate, said plate having an air and gas discharge opening and an air inlet opening in spaced parallel relation to the air and gas discharge opening, said plate having spaced parallel electrode receiving openings therein, all of said openings lying within the area of the plate defined by the collar, a container for a saline solution detachably supported within the housing by the screw threaded collar, electrodes within the housing extending through the electrode receiving openings in the plate for immersion in saline solution in the container, means within the housing to supply direct current to the immersed electrodes to generate chlorine gas in the container, a motor driven blower mounted within the housing on the supporting plate to introduce air through the air inlet opening into the container to mix with the gas therein and a flexible tube connected to the air and gas discharge opening and extending through the housing to conduct the mixture of air and gas to a zone of application.

SIMON M. GOLDBERG.

REFERENCES CITED

The following references are of record in the file of this patent:

UNITED STATES PATENTS

| Number | Name | Date |
| --- | --- | --- |
| 1,678,625 | Wallace et al. | July 24, 1928 |
| 2,256,212 | Morrison | Sept. 16, 1941 |